Figure 1:
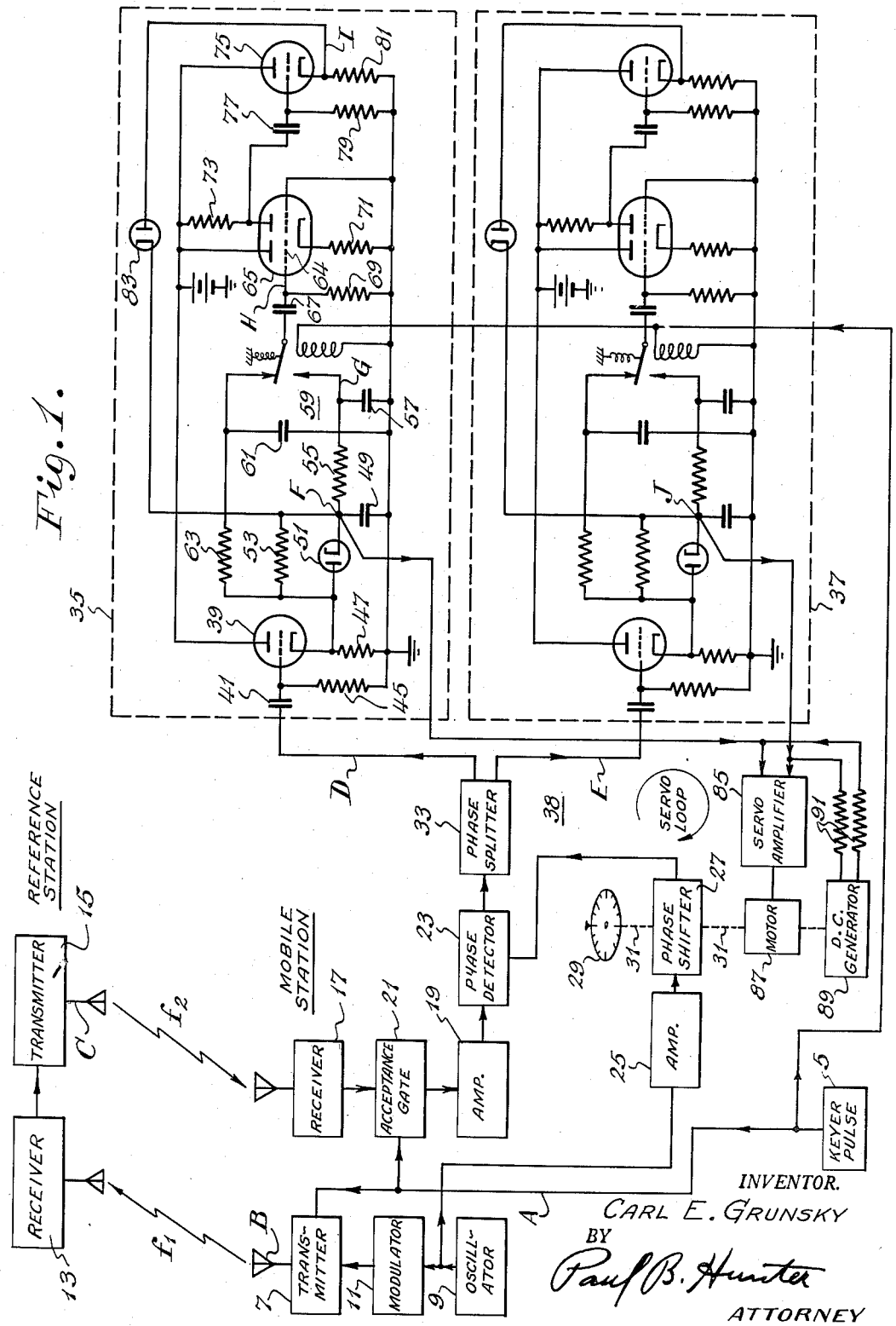

Dec. 27, 1955   C. E. GRUNSKY   2,728,907
SERVO SYSTEMS FOR PULSE SIGNALS
Filed Feb. 16, 1950   2 Sheets-Sheet 1

INVENTOR.
CARL E. GRUNSKY
BY
Paul B. Hunter
ATTORNEY

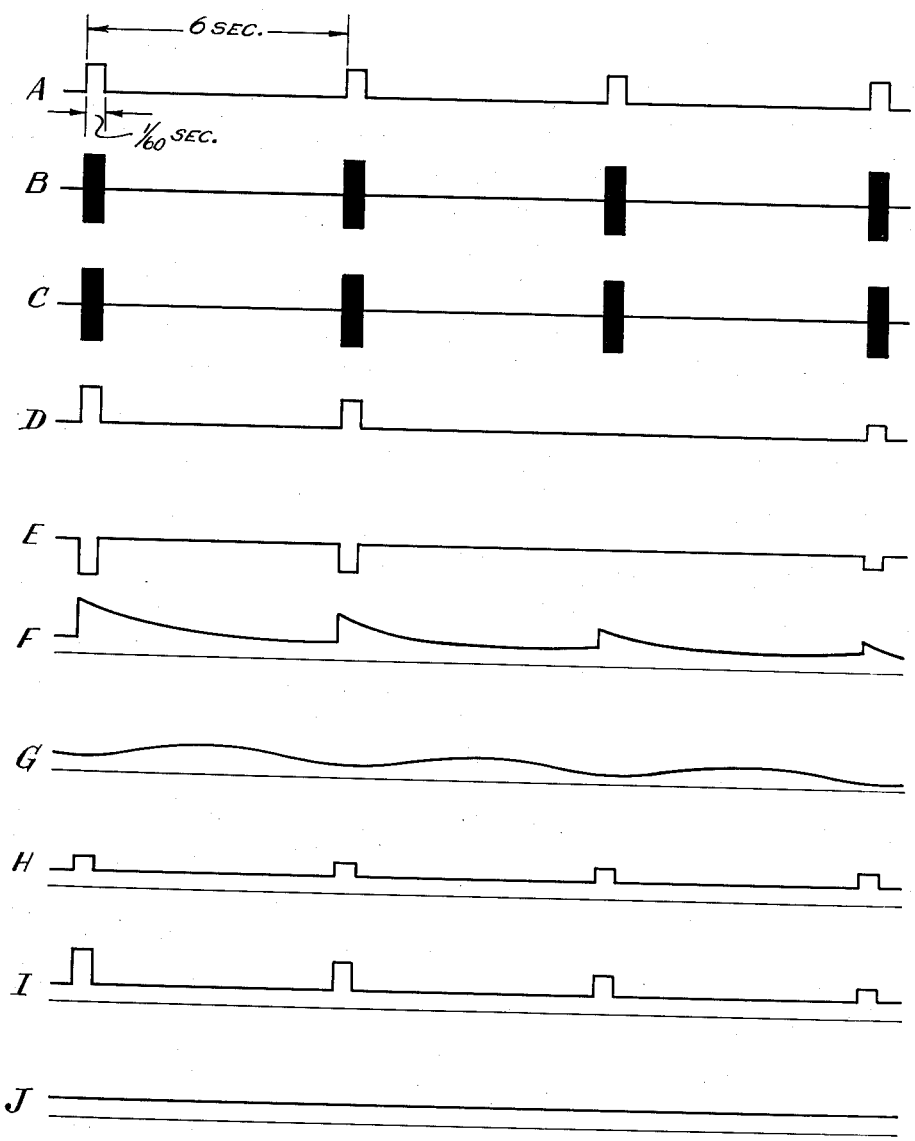

United States Patent Office 2,728,907
Patented Dec. 27, 1955

2,728,907

SERVO SYSTEMS FOR PULSE SIGNALS

Carl E. Grunsky, Garden City, N. Y., assignor to Sperry Rand Corporation, a corporation of Delaware Application February 16, 1950, Serial No. 144,434

15 Claims. (Cl. 343—13)

This invention relates to servo systems for use with pulse signals and to memory circuits for such servo systems.

Copending patent applications of J. Lyman et al., Serial No. 88,522 filed April 20, 1949, now U. S. Patent No. 2,616,076 issued on October 28, 1952, and George B. Litchford et al., Serial No. 94,012 filed May 18, 1949, now U. S. Patent No. 2,689,953 issued September 21, 1954, disclose air traffic control systems in which the position of the aircraft is determined by measuring the distance, the azimuth and the elevation of the aircraft with respect to a reference station located at the airport. The present disclosure shows improved apparatus for measuring the distance of the aircraft from the reference station.

In accordance with the present disclosure, modulated pulsed radio frequency signals are transmitted from the aircraft to the reference station where they are received and demodulated and the modulations are retransmitted to the aircraft on a different radio frequency. The retransmitted signals are received at the aircraft and the phase of the modulations of the received signal with reference to the modulations of the signals originally transmitted is determined, thereby providing a measure of the distance between the aircraft and the reference station.

The pulsed radio frequency signals are of fairly short duration and have a long recurrence period, thereby permitting several aircraft to operate on the same frequencies and to employ the same reference station to provide the retransmitted signal.

In accordance with the present invention, a servo system is provided to indicate the difference in phase between the modulations of the pulse signals transmitted from and received at the aircraft. The servo system is provided with compensating means for preventing it from being adversely affected if a few of the pulses are abnormally attenuated or are not received at all. For example, if part of the aircraft structure were between the antennas of the reference station and the aircraft, the energy received at the aircraft antenna would be greatly attenuated.

It is an object of the invention to provide a servo system for use with pulse signals.

Another object of the invention is to provide a servo system for use with pulse signals in which the servo system is not adversely affected if a few of the pulse signals are abnormally attenuated or are non-existent.

A further object of the invention is to provide an improved distance measuring system employing modulated, pulsed radio frequency signals.

Other objects and advantages of the invention will be apparent from the following description, the appended claims, and the drawings, in which Fig. 1 is a schematic diagram of a preferred embodiment of the invention; and Fig. 2 shows various curves representing the waveform of and time relationships among signals which occur in various parts of the system shown in Fig. 1.

In the description of the preferred embodiment of this invention which follows, frequent reference will be made to Fig. 2 which shows the waveform of and time relations among the various signals which occur in the apparatus disclosed in Fig. 1. It is to be observed that the letter which identifies each curve in Fig. 2 is also employed in Fig. 1 to identify the circuit which conveys the corresponding signal.

Referring now to the drawings, the mobile station on the aircraft contains a keyer pulser 5 which serves to produce a series of pulses A which are of fairly short duration (e. g. 1/60 sec.) and which have a relatively long repetition period (e. g. 6 sec.). The operation of the keyer pulser 5 may be initiated by an operator in the aircraft, but preferably the operation of the keyer 5 is initiated by radio means located at the reference station such as that disclosed in said copending application Serial No. 94,012.

The pulses A serve to actuate the transmitter 7 which produces a series of radio frequency pulses B having a frequency $f_1$. The pulse signals B produced by the transmitter 7 are frequency modulated at the frequency of the signal produced by a fixed frequency oscillator 9 which is applied to the modulator 11 and thence to the transmitter 7.

The modulated signals B are received and retransmitted as modulated pulse signals C on a frequency $f_2$ by means of a transpondor comprising a receiver 13 and a transmitter 15 located at the reference or airport station.

A receiver 17 on the aircraft receives the retransmitted signals C, and the detected signals produced by the receiver 17 are applied to an amplifier 19 through an acceptance gate 21. The acceptance gate 21 is connected to the keyer pulser 5 so that the gate 21 is actuated during each of the pulses A. The output of the amplifier 19 is applied to a phase detector 23.

The output of the oscillator 9 is also applied to an amplifier 25, and the output of the amplifier 25 is applied to the phase detector 23 through a phase shifter 27.

Preferably, the frequency of the oscillator 9 is adjusted to be equal to the velocity of the radio frequency waves divided by the maximum distance to be measured.

For this adjustment, a phase difference of 180° between the modulations of the transmitted signals and the modulations of the received signals represents the maximum distance to be measured, a phase difference of 90° represents one-half the maximum distance, etc.

Since the time required for the radio wave to travel from the aircraft to the reference station and back to the aircraft is very small compared to the period of each pulse, it follows that the acceptance gate 21 is actuated during almost the entire period of each of the pulses received by the receiver 17.

Thus, the output of the amplifier 19 is a pulsed alternating current signal in which the alternating current has a frequency equal to the frequency of the continuous signal produced at the output of the amplifier 25. The phase difference between the two alternating current signals is directly proportional to the distance between the aircraft and the reference station.

The output of the phase detector 23 is a pulsed signal, and the magnitude and polarity of each of the pulses is determined by the phase difference between the two alternating current signals applied to the phase detector.

The phase detector 23 and the phase shifter 27 are part of a servo loop 38 which automatically adjusts the phase shifter 27 so as to cause the magnitude of the pulses at the output of the phase detector to approach zero as will be explained below. Thus, the phase difference between the modulations of the pulses transmitted by the transmitter 7 and the modulations received by the receiver 17 may be measured by means of a mechanical indicator 29 attached to the shaft 31 which operates the phase shifter 27.

The error pulses produced by the phase detector 23 are applied to a phase splitter 33 which produces pulses D and E, the pulses D being of the same polarity as the pulses produced at the output of the phase detector 23 and the pulses E being of equal magnitude to the pulses D but of opposite polarity.

The pulses D and E are applied to smoothing and memory circuits 35 and 37 respectively. The two smoothing and memory circuits 35 and 37 are identical and function in the same manner, the circuit 35 serving to produce an error signal when the pulses produced by the phase detector 23 are of positive polarity and the circuit 37 serving to produce an error signal when the pulses produced by the phase detector 23 are of negative polarity.

The description which follows is based upon the condition when the pulses D are positive and the pulses E are negative. For this condition the memory circuit 35 produces the control signals for the servo loop 38, as will be explained below. It will be understood that when the pulses D are negative and the pulses E are positive the circuit functions in substantially the same manner except that the memory circuit 37 then produces the control signals for the servo loop 38.

The pulses D are applied to the control grid of a cathode follower tube 39 through a coupling condenser 41. A resistor 45 provides a grid resistor for the tube 39.

The positive pulses produced across the cathode load resistor 47 are applied to a condenser 49 through a diode 51. The condenser 49 is charged during each pulse D, and the condenser slowly discharges through the resistors 47 and 53 during the intervals between the pulses D to produce signals having a waveform F across the condenser 49. When negative pulses are produced across the resistor 47, they do not affect the voltage across the condenser 49 due to the unilateral action of the diode 51.

An integrating network comprising a resistor 55 and a condenser 57 is connected across the condenser 49 to further smooth the signals F and produce a signal G which is applied to the front contact of a relay 59. This signal G varies in accordance with the sum of the bias voltage produced across the resistor 47 and the average value of the voltage drop produced across the resistor 47 due to the pulses.

A condenser 61 and a resistor 63 are connected in series across the cathode load resistor 47. These circuit constants are proportioned so that the condenser 61 is charged to the average value of the voltage produced across the resistor 47, and the voltage across the condenser 61 is applied to the back contact of the relay 59. This voltage is substantially equal to the bias voltage produced across the resistor 47 since the time constant of the integrating circuit 61, 63 is large relative to the duration of the pulses D and the time intervals between the pulses D are large.

The winding of the relay 59 is energized by the keyer pulser 5 so that the armature of the relay 59 is in contact with the back contact except during each pulse A when the armature is in contact with the front contact.

The control grid 64 of one section of a twin triode amplifier tube 65 is coupled to the armature of the relay 59 by a condenser 67. A grid resistor 69 serves to connect the condenser 67 between the armature of the relay 59 and ground so that the voltage across the condenser 67 is maintained at the average value of the voltage across the condenser 61 (i. e. the bias voltage developed across the resistor 47) when the armature of the relay 59 is in a released condition. When the armature is in an operated condition, the voltage applied to the control grid 64 is increased by an amount which is substantially equal to the component of the voltage produced across the condenser 57 which is due to the pulses. Thus, this voltage which is applied to the control grid 64 is equal to the magnitude of the signal G less the component of the voltage produced across the condenser 57 which is due to the bias voltage developed across the resistor 47. The voltage applied to the control grid 64 has a waveform H which is of substantially constant magnitude between the pulses A and which has a magnitude during the pulses A which varies in accordance with the average magnitude of the concurrent pulses D. The pulses H are thus created from an integrated version of the preceding error signals D and appear concurrent with the true error pulses D.

The pulses H are amplified by the first (cathode follower) section of the tube 65 to produce a signal across the cathode resistor 71 which in turn is amplified without phase reversal by the second section of the tube 65 to produce a signal across the plate resistor 73. This signal is applied to the control grid of a cathode follower tube 75 through a condenser 77. A resistor 79 serves as a grid return, and a resistor 81 serves as a load resistor for the cathode follower across which a signal I is produced.

Preferably the circuit constants of the amplifiers 65 and 75 are proportioned so that the pulses H are amplified by an amount such that the pulses I produced across the resistor 81 are of slightly less magnitude than the true error pulses D.

The pulses I are applied to the anode of a diode 83, and the cathode of the diode 83 is connected to the ungrounded side of the condenser 49.

It should be observed that the bias voltage developed across the resistor 81 should always be equal to or less than the bias voltage developed across the resistor 47 in order to cause the condenser 49 to discharge through the resistor 47 at all times.

Thus, the diode 83 has a cathode potential which is slightly positive with respect to its anode when true error pulses D are being produced. However, if one or more of the pulses received by the receiver 17 are substantially weaker than average or are not received at all, the pulses D are weaker than average or are non-existent (as indicated after the second pulse in Fig. 2D) and the anode of the diode 83 is caused to be of positive polarity with respect to its cathode so that the diode 83 conducts and charges the condenser 49 to almost the same voltage as it would have been charged to if a true error pulse D had been produced.

Thus, the signals F are not materially affected by a few missing pulses, and a continuous sawtooth-shaped signal is maintained across the condenser 49.

Since the smoothing and memory circuit 37 is identical to the circuit 35 it will not be described herein. As explained with reference to the circuit 35, the circuit 37 does not respond to the negative pulses E so a substantially constant output signal J is produced thereby.

The signals F and J are applied to a push-pull servo amplifier 85 so that the amplifier produces a signal of one polarity if the signals F are of sawtooth waveform and of the opposite polarity if the signals J are of sawtooth waveform.

The output of the servo amplifier 85 is applied to a motor 87 which serves to control the phase shifter 27 by means of the shaft 31.

A D. C. generator 89 is rotated by the movements of the armature of the motor 87. The D. C. voltage produced by the generator 89 is applied to the servo amplifier 85 through a pair of resistors 91. The generator 89 is connected so that the voltage produced thereby and applied to the amplifier 85 is of opposite polarity to and of less magnitude than the signal which is applied to the amplifier 85 by the memory circuit 35 or 37 which is producing the control signal. Thus, the generator 89 serves as a damping means for the motor 87.

Suitable values for the circuit constants of the smoothing and memory circuit 35 are as follows:

| | |
|---|---|
| Tube 39 | 6C4. |
| Condenser 41 | 1 microfarad. |
| Resistor 45 | 1 megohm. |
| Resistor 47 | 20,000 ohms. |
| Condenser 49 | 1 microfarad. |
| Diodes 51 and 83 | 6AL5. |
| Resistor 53 | 2 megohms. |
| Resistor 55 | 30 megohms |
| Condenser 57 | 1 microfarad. |
| Condenser 61 | 1 microfarad. |
| Resistor 63 | 1.5 megohms. |
| Tube 65 | 12AU7. |
| Condenser 67 | 1 microfarad. |
| Resistor 69 | 1 megohm. |
| Resistor 71 | 15,000 ohms. |
| Resistor 73 | 100,000 ohms. |
| Tube 75 | 6C4. |
| Condenser 77 | 1 microfarad. |
| Resistor 79 | 1 megohm. |
| Resistor 81 | 15,000 ohms. |

It is to be observed that the accuracy of the distance indication is somewhat impaired for a few seconds after the aircraft passes over the reference station or during the time when the aircraft makes a very sharp turn as it approaches or leaves the reference station. This inaccuracy results because the servo system responds rather slowly and because one of the memory circuits 35, 37 continues to produce a few pulses after the other memory circuit is actuated by a reversal of the polarity of the pulses produced by the phase detector 23. The inaccuracy after the aircraft passes over the reference station can be reduced somewhat by disabling the memory circuits 35, 37 as the aircraft passes over the reference station since the signal strength near the reference station is high and there is little likelihood that any of the pulses will be greatly attenuated.

It will be apparent that the servo system and the memory circuits disclosed herein are not limited to use with distance measuring apparatus but that these circuits may be employed in various systems which employ pulse signals.

Since many changes could be made in the above construction and many apparent widely different embodiments of this invention could be made without departing from the scope thereof, it is intended that all matter contained in the above description or shown in the accompanying drawings shall be interpreted as illustrative and not in a limiting sense.

What is claimed is:

1. In a system adapted to respond to a series of pulses, an impedance adapted to be energized by said pulses, a signal generator means responsive to the voltage across said impedance, control means operated in timed relation to said series of pulses for periodically supplying said voltage to said signal generator means whereby to produce a second series of pulses synchronized with said first-mentioned pulses, the pulses of said second series having magnitudes which are substantially equal to the average magnitude of the pulses of said first-mentioned series, and a unidirectional conductor connecting the output circuit of said signal generator across said impedance in such manner that it may supply the output voltage to said impedance in the same polarity as the first series of pulses.

2. In a system adapted to respond to a series of pulses, an impedance adapted to be energized by said pulses, an integrating circuit responsive to the voltage across said impedance, amplifier means, means operated in timed relation to said series of pulses for periodically supplying the output of said integrating circuit to said amplifier means whereby to produce a series of unidirectional pulses synchronized with the pulses of said first-mentioned series and having magnitudes which are approximately equal to the average magnitude of the pulses of said first-mentioned series, and means connecting the output circuit of said amplifier means across said impedance in such manner that the voltage so fed back will be supplied to said impedance in the same polarity as the first mentioned series of pulses.

3. The apparatus of claim 2, wherein said last-mentioned means is a unidirectional conductor.

4. In a system adapted to respond to a first series of unidirectional pulses, a condenser adapted to be charged by each of said pulses, an integrating circuit responsive to the voltage across said condenser, amplifier means, means operated in timed relation to said first series of pulses for periodically supplying the signal produced by said integrating circuit to said amplifier means whereby to produce a second series of unidirectional pulses synchronized with the pulses of said first series and having magnitudes which are substantially equal to and which vary in accordance with the average magnitude of the pulses of said first series, and a unidirectional conductor connecting the output circuit of said amplifier means across said condenser in such manner that it may supply the output voltage to said condenser in the same polarity as the first series of pulses.

5. The apparatus of claim 4 wherein the pulses of said second series occur concurrently with the pulses of said first series.

6. In a system adapted to respond to a series of pulses, an input circuit, a condenser, a first unidirectional conductor connecting said condenser across said input circuit, an integrating circuit responsive to the voltage across said condenser, an amplifier, means for periodically applying the signal produced by said integrating circuit to the input of said amplifier, and a second unidirectional conductor connecting the output circuit of said amplifier across said condenser in the same polarity as the pulses of said first series.

7. In a system adapted to respond to a first series of unidirectional pulses, an input circuit, a condenser, a first unidirectional conductor connecting said condenser across said input circuit, an integrating circuit responsive to the voltage across said condenser, an amplifier, means for applying the signal produced by said integrating circuit to the input of said amplifier during each pulse of said first series, said amplifier serving to produce a second series of unidirectional pulses having magnitudes which are slightly less than and which vary in accordance with the average magnitude of the pulses of said first series, and a second unidirectional conductor connecting the output circuit of said amplifier across said condenser in such manner that it may supply the output voltage to said condenser in the same polarity as the first series of pulses, said second unidirectional conductor being connected in such polarity as to prevent discharge of said condenser through the output circuit of said amplifier.

8. In a system adapted to respond to a series of unidirectional pulses, an input circuit, a condenser, a first unidirectional conductor connecting said condenser across said input circuit, a large impedance connected across said first unidirectional conductor, a first integrating circuit responsive to the voltage across said condenser, a second integrating circuit responsive to the voltage across said input circuit, an amplifier, means for applying a voltage substantially equal to the difference between the voltages produced by said integrating circuits to the input of said amplifier during each pulse of said series, and a second unidirectional conductor connecting the output circuit of said amplifier across said condenser in the same polarity as the pulses of said first series.

9. In combination, a phase detector having a pair of input circuits, means for applying first and second alternating current signals to the respective input circuits of said phase detector, at least one of said signals being pulsed, a pair of impedances, means responsive to the output pulses produced by said phase detector for energizing one of said impedances when the output pulses are of one polarity and for energizing the other of said impedances when the output pulses are of the other polarity, amplifier means, means operated in timed relation with the output pulses produced by said phase detector for periodically supplying the signals across the impedance which is being energized to said amplifier means whereby to produce a series of unidirectional pulses synchronized with the output pulses of said phase detector, said series of unidirectional pulses having magnitudes which are approximately equal to the average magnitude of the signals energizing said impedance, a unidirectional conductor means connecting the output circuit of said amplifier means across the impedance of said pair of impedances which is being energized by the output of said phase detector, said unidirectional conductor being connected in such manner that it may supply the output voltage of said amplifier means to said impedance in the same polarity as the signals energizing said impedance from said phase detector, and means responsive to the signals produced across said impedances for shifting the relative phase of the signals applied to said phase detector.

10. In combination, a phase detector having a pair of input circuits, means including a phase shifter for applying a first alternating current signal to one of said input circuits, means for applying a second alternating current signal to the other of said input circuits, at least one of said signals being pulsed, a pair of condensers, means responsive to the output pulses produced by said phase detector for charging one of said condensers when the output pulses are of one polarity and for charging the other of said condensers when the output pulses are of the other polarity, a pair of integrating circuits responsive to the voltages across the respective condensers, amplifier means, means operated in timed relation with the output pulses produced by said phase detector for periodically supplying the signals produced by said integrating circuits to said amplifier means whereby to produce a series of unidirectional pulses synchronized with the output pulses produced by said phase detector, unidirectional conductor means connecting the output circuit of said amplifier means across the condenser of said pair of condensers which is being charged by the output of said phase detector, said unidirectional conductor being connected in such manner that it may supply the output voltage of said amplifier means across the condenser in the same polarity as the signal from the phase detector energizing said condenser, and means responsive to the signals produced across said condensers for actuating said phase shifter.

11. The apparatus of claim 10, wherein the pulses of said series of unidirectional pulses occur concurrently with the pulses applied to said phase detector.

12. In combination, a source of oscillations, means connected to said source of oscillations for transmitting a series of pulse signals modulated at the frequency of said source of oscillations, a transpondor for receiving and retransmitting said signals, a receiver responsive to said retransmitted signals, a phase detector responsive to the signals produced by said source of oscillations and said receiver for producing a series of pulses having magnitudes and polarities determined by the difference in phase between said signals, a pair of impedances, means responsive to the output of said phase detector for energizing one of said impedances when the output pulses are of one polarity and for energizing the other of said impedances when the output pulses are of the other polarity, amplifier means, means operated in timed relation with the series of pulses produced by said phase detector for periodically supplying the signals across the impedance which is being energized to said amplifier means whereby to produce a series of unidirectional pulses synchronized with the output pulses produced by said phase detector, said series of unidirectional pulses having magnitudes which are almost equal to the average magnitude of the signals energizing said impedance, unidirectional conductor means connecting the output circuit of said amplifier means across the impedance of said pair of impedances which is being energized by the output of said phase detector, said unidirectional conductor being connected in such manner that it may supply the output voltage of said amplifier means to said impedance in the same polarity as the signals energizing said impedance from said phase detector, and means responsive to the signals produced across said impedances for shifting the relative phase of the signals produced by said source of oscillations and said receiver.

13. The apparatus of claim 12 wherein said pair of impedances are condensers.

14. In combination, a source of oscillations, means connected to said source of oscillations for transmitting a series of pulse signals modulated at the frequency of said source of oscillations, a transpondor for receiving and retransmitting said signals, a receiver responsive to said retransmitted signals, a phase detector responsive to the signals produced by said source of oscillations and said receiver for producing a series of pulses having magnitudes and polarities determined by the difference in phase between said signals, a pair of condensers, means responsive to the output pulses produced by said phase detector for charging one of said condensers when the output pulses are of one polarity and for charging the other of said condensers when the output pulses are of the other polarity, a pair of integrating circuits responsive to the voltages across the respective condensers, amplifier means, means operated in timed relation with the output pulses produced by said phase detector for periodically supplying the signals produced by said integrating circuits to said amplifier means whereby to produce a series of unidirectional pulses synchronized with the output pulses of said phase detector, said series of unidirectional pulses having magnitudes which are slightly less than the average magnitude of the signals charging said condensers, unidirectional conductor means connecting the output circuit of said amplifier means across the condenser of said pair of condensers which is being charged by the output of said phase detector, said unidirectional conductor being connected in such manner that it may supply the output voltage of said amplifier means across the condenser in the same polarity as the signal from the phase detector energizing said condenser, and means responsive to the signals produced across said condensers for shifting the relative phase of the signals produced by said source of oscillations and said receiver.

15. The apparatus of claim 14 wherein each pulse of said series of unidirectional pulses occurs concurrently with a pulse produced by said transmitting means.

References Cited in the file of this patent

UNITED STATES PATENTS

| | | |
|---|---|---|
| 2,422,074 | Bond | June 10, 1947 |
| 2,426,256 | Zenon | Aug. 26, 1947 |
| 2,439,324 | Walker | Apr. 6, 1948 |
| 2,455,283 | Valley | Nov. 30, 1948 |
| 2,506,770 | Braden | May 9, 1950 |
| 2,513,282 | Busignies | July 4, 1950 |
| 2,519,778 | Mizen | Aug. 22, 1950 |
| 2,546,918 | Branson | Mar. 27, 1951 |
| 2,553,752 | Lange | May 22, 1951 |
| 2,583,587 | Milsom | Jan. 29, 1952 |